March 20, 1962 W. J. BINKLEY ET AL 3,025,850
STOVE FOR USE OUTDOORS
Filed June 3, 1959

William J. Binkley
Clifford T. Binkley
Ralph V. Packer
INVENTORS

United States Patent Office 3,025,850
Patented Mar. 20, 1962

3,025,850
STOVE FOR USE OUTDOORS
William J. Binkley, 3751 Knox Ave. N., and Clifford T. Binkley, 3758 Lyndale Ave. N., both of Minneapolis, Minn., and Ralph V. Packer, Robbinsdale, Minn.; said Packer assignor to said William J. Binkley and said Clifford T. Binkley
Filed June 3, 1959, Ser. No. 817,896
2 Claims. (Cl. 126—43)

The present invention relates to a portable stove for use outdoors when on a picnic, at the beach, or while camping, and has reference, more particularly, to a stand having means for harnessing and clamping the same atop a can of ready-to-use solidified alcohol or an equivalent container of "canned heat."

It is recognized that campers, tourists and other out-of-doors travelers have successfully used, at one time or another, concentrated "canned heat" commonly known on the market as Sterno. As a matter of fact, patents have been granted on attachments for cans in this category wherein the attachment serves as a prop or stand and elevates the cooking utensil above the flame issuing from the open top of the can. For example a typical can attachment serving as a stand is exemplified in the Crane Patent No. 1,277,872 of September 3, 1918. It will be evident by comparing the two stands that the object of the invention here is to advance the art and to provide members of the public with a practical, economical and simple can attachment which allows the can to serve as a base and which elevates the utensil to a desirable cooking plane and which, being structurally distinct, constitutes a novel contribution to the art.

Other objects, features and advantages will become more readily apparent from the following description and the accompanying drawing.

In the drawing, wherein like numerals are employed to designate like parts throughout the views.

Figure 1:
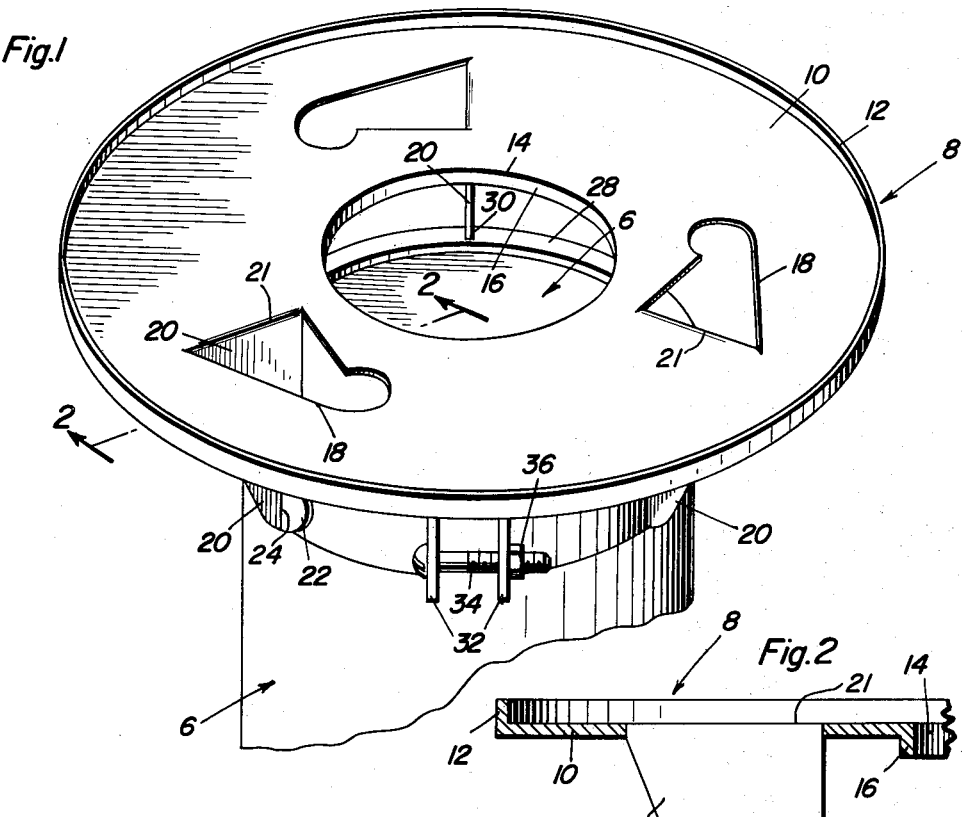
FIG. 1 is a fragmentary perspective view showing a portion of the can of solidified alcohol and the improved utensil stand attached and clamped and adapted to be used as a utensil elevating and supporting as well as heating plate.
Figure 2:
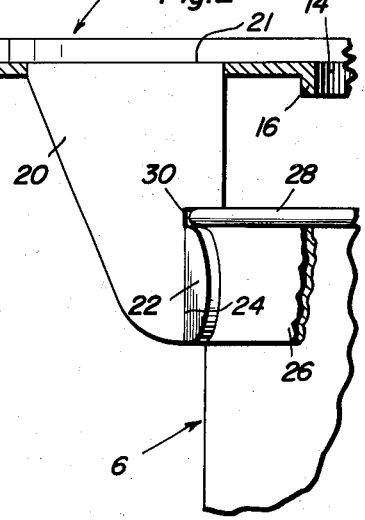
FIG. 2 is a fragmentary view in section and elevation taken on the plane of the line 2—2 of FIG. 1, looking in the direction of the arrows.
Figure 3:
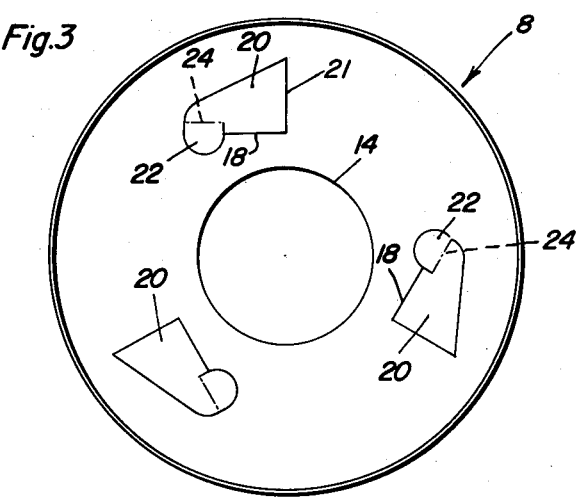
FIG. 3 is a plan view of the sheet matal annulus with portions cut out to define the utensil basing and supporting plate and the desired legs.

With reference to FIGS. 1 and 2 the numeral 6 designates the portable base. More specifically, this base comprises a can of ready-to-use concentrated solidified alcohol commonly referred to in the trade by most purchasers as "canned heat" but perhaps better known by the trademark Sterno. The utensil basing, support and also heating plate, the principal component of the attachable stand, is denoted generally by the numeral 8 and it comprises a ring-like plate 10 and outer periphery of which is provided with an upstanding guard, reinforcing and retaining flange or lip 12. This plate may be alternatively designated as an annulus, as shown for example in FIG. 3, and has a central opening defined by the inner peripheral edge, the opening being denoted at 14 and the edge having a depending reinforcing lip 16. This plate is provided at equidistant circumferentially spaced points with struck-out tongues. More particularly, portions are stamped out to provide cut-outs denoted at 18 and the tongue is struck down, the tongue being denoted at 20 and being bent or folded at 21 and defining a supporting leg. The lower end of the leg is preferably provided with a lateral or side extension 22 which is bent at 24 to define an attaching ear or lug and this is superimposed on and welded or otherwise joined to a split collar or band 26 which embraces the upper portion of the can 6 below the bead 28 as brought out in FIG. 2. Then, too, the cut-out is shaped in such a way that a notch 30 is provided at the juncture of the lower end of the leg and the attaching lug 22 and this notch serves to engage over the bead to thus provide a rigid jointing and supporting connection between the legs and the split band or collar. The spaced end portions of the band have outstanding ears 32 which accommodate a bolt 34 and a nut 36 providing a satisfactory clamp-equipped collar. Thus by applying the collar or band to the can below the bead a satisfactory coupling is provided between the base or can 6 and the elevated leg supported flanged utensil plate 10.

This unique attachment is regarded as an innovation in that it enables the user to utilize a purchased can of solidified alcohol and by applying the attachment thereto to thus have at his disposal a simple and economical stove. The lid to the can will pass between the spaces between the legs or plate elevating struts making it possible to open and close the can without removing the attachment until the can is empty. Then the attachment can be removed and attached in a now-obvious manner to another ready-for-use can of alcohol. The hole provided at the center of the plate will allow the flame to pass up and impinge on the bottom of the cooking utensil (not shown). The invention is small, light in weight and readily applicable and removable and highly economical. It will therefore serve the purposes for which it is intended.

The foregoing is considered as illustrative only of the principles of the invention. Further, since numerous modifications and changes will readily occur to those skilled in the art, it is not desired to limit the invention to the exact construction and operation shown and described and accordingly all suitable modifications and equivalents may be resorted to, falling within the scope of the invention as claimed.

What is claimed as new is as follows:

1. A cooking utensil supporting stand, said stand being readily attachable to and thereafter removable from a can of concentrated alcohol and comprising a split band of fire-proof metal adapted to embrace an upper portion of said can and constituting an adapter collar, said band having spaced end portions provided with outwardly and radially directed terminal ends constituting lugs, a bolt and nut carried by the lugs and adapted to removably bind the band on the can, a horizontal annular flat-faced plate of an outside diameter greater than the outside diameter of said band and adapted when in use to overhang the can, said plate having the periphery of the central opening therein provided with a depending endless reinforcing lip, the outer marginal edge being provided with an upstanding endless reinforcing flange, said plate being provided with circumferentially spaced depending legs and said legs being joined to the collar at equidistant places, each leg comprising a tongue which is struck out from the plate midway between the lip an flange, said tongue being vertical to the plane of the plate, a lower portion of said tongue having a lug which is bent at a right angle to the main portion of the tongue and superimposed on and fastened to an exterior surface of the collar, and said lug forming with that portion of the inner edge of the tongue just above the lug a notch, said notch being adapted to accommodate a bead such as is commonly provided on said can.

2. A cooking utensil supporting stand, said stand being readily attachable to and thereafter removable from a can of concentrated alcohol and comprising a band of fire-proof metal adapted to embrace an upper portion of said can and constituting a collar, a horizontal annular flat-faced plate of an outside diameter greater than the outside diameter of the band and adapted to overhang the can, said plate being provided with circumferentially spaced depending legs and said legs being joined to the band at equidistant places, each leg comprising a tongue which is struck out from the plate, said tongue being vertical to the plane of the plate, a lower portion of said tongue having a lug which is bent at a right angle to the main portion of the tongue and superimposed on and fastened to an exterior surface of the band, and said lug forming with that portion of the inner edge of the tongue just above the lug a notch, said notch being adapted to accommodate a bead such as is commonly provided on said can.

References Cited in the file of this patent

UNITED STATES PATENTS

| | | |
|---|---|---|
| 250,111 | Tallmadge | Nov. 29, 1881 |
| 1,204,984 | Inabinett et al. | Nov. 14, 1916 |
| 1,217,139 | Bergen | Feb. 27, 1917 |
| 1,277,872 | Crane | Sept. 3, 1918 |
| 1,988,642 | Wolbers | Jan. 22, 1935 |

FOREIGN PATENTS

| | | |
|---|---|---|
| 136,999 | Australia | Apr. 24, 1950 |